Aug. 12, 1969    R. E. MORGAN    3,461,317
COMMUTATION SCHEME FOR POWER SEMICONDUCTOR CIRCUITS FOR
LIMITING RATE OF REAPPLIED VOLTAGE AND CURRENT
Filed Oct. 24, 1965    9 Sheets-Sheet 1

Inventor:
Raymond E. Morgan,
by Charles W. Helzer
His Attorney.

Inventor:
Raymond E. Morgan,
by Charles W. Helzer
His Attorney.

Inventor:
Raymond E. Morgan,
by Charles W Helzer
His Attorney.

Inventor:
Raymond E. Morgan,
by Charles W. Hebзер
His Attorney.

Inventor:
Raymond E. Morgan,
by Charles W Helzer
His Attorney.

Inventor:
Raymond E. Morgan,
by Charles W Helzer
His Attorney.

Inventor:
Raymond E. Morgan,
by Charles W. Helger
His Attorney.

United States Patent Office 3,461,317
Patented Aug. 12, 1969

3,461,317
COMMUTATION SCHEME FOR POWER SEMICONDUCTOR CIRCUITS FOR LIMITING RATE OF REAPPLIED VOLTAGE AND CURRENT
Raymond E. Morgan, Schenectady, N.Y., assignor to General Electric Company, a corporation of New York
Filed Oct. 24, 1965, Ser. No. 504,744
Int. Cl. H03k 17/08
U.S. Cl. 307—252                              11 Claims

ABSTRACT OF THE DISCLOSURE

A soft commutation circuit for thyristors such as the SCR and triac is provided in a family of solid state time ratio control and inverter circuits to limit the rate of reapplied voltage after commutation, or the rate of change of current upon turning on the device, or both. A commutating capacitor connected to limit $dv/dt$ and a series blocking diode are operatively coupled across the load terminals of the thyristor in such manner as to charge the capacitor while the device is nonconducting. A resonating and cushioning inductor can limit load current $di/dt$ and is coupled by a feedback path to the commutating capacitor to reverse the polarity of its charge and forward bias the diode when it is desired to effect commutation.

---

This invention relates to semiconductor power circuits. More specifically, the invention relates to new and improved soft commutation circuits for use with power semiconductor devices of the type requiring a reversal of the polarity of the potential across the terminals of the device, or alternatively a reversal of the direction of the current flow therethrough, in order to discontinue conduction through the device. The invention also relates to new and improved power circuits employing the soft commutation circuits herein described.

The use of power semiconductor devices for control of electric power has now become quite common throughout most of the electrical industry. A significant portion of these power semiconductor devices, known as thyristors and typified by such devices as the silicon controlled rectifier, the triac and the diac, are the type which require some form of external turn-off after they have been placed in a conducting state. The turn-off process, which generally requires reversal of the polarity of the potential across the load terminals of the device, or expressed differently, a reversal of the direction of current flow through the device, is termed commutation. The external circuitry which accomplishes turn-off of a thyristor is known as a commutation circuit.

There are a number of known commutation circuits for power semiconductors of the above-mentioned type which are satisfactory for use in a wide number of circuit applications. There are a certain number of circuit applications, however, with which existing commutation circuits cannot be used. This is due to the fact that many existing power semiconductor devices are not capable of operating with high rates of re-applied voltage (high $dv/dt$), or large rates of change of current (high $di/dt$) without the use of special softening components that introduce losses in heating especially at higher frequencies of operation. To overcome these difficulties, the present circuits have been devised.

It is therefore a primary object of the present invention to provide new and improved soft commutation circuits for use with power semiconductors of the thyristor type requiring external circuitry to accomplish turn-off.

A further object of the invention is the provision of soft commutation circuits which allow thyristor semiconductor power circuits to be used at higher frequencies of operation and at large power ratings.

Another object of the invention is the provision of new and improved soft commutation circuits which can be used with existing power semiconductor devices and circuit techniques to greatly reduce radio frequency interference or other undesirable effects.

In practicing the invention, a number of soft commutation circuits for thyristor power semiconductor devices are provided. These circuits comprise commutating capacitance means and unidirectional conducting means connected in series circuit relationship with the series circuit thus formed being adapted to be operatively coupled across the load terminals of thyristor power semiconductor devices of the type requiring either a reversal in the polarity of the potential across its load terminals, or a reversal in the direction of current flow therethrough in order to discontinue conduction through the device. The series circuit is connected in a manner such that the commutating capacitance means is operatively coupled across the power semiconductor device and limits the rate of rise of reapplied voltage across the device upon the device reverting to its blocking non-conducting condition. The commutation circuit is further comprised by resonating and cushioning inductance means operatively connected in circuit relationship with the power semiconductor for limiting the rate of rise of load current through the device upon the device being turned on. The circuit is further comprised by feedback means providing a feedback path between the resonating and cushioning inductance means and the commutating capacitance means for feeding back the energy of the resonating and cushioning inductance means to the commutating capacitance means to reverse the polarity of the potential across the commutating capacitance means during commutating intervals to thereby commutate off the power semiconductor device.

In certain embodiments of the invention, the soft commutation circuit will include only the capacitance means and unidirectional conducting means operatively coupled across the load terminals of the power semiconductor device to be commutated. In other embodiments of the invention, the commutation circuit will include only the resonating and cushioning inductance means for limiting the rate of rise of load current through the device and the feedback means for feeding back the energy of the resonating and cushioning inductance means to a commutation circuit means for use in the commutation operation. In preferred embodiments of the new and improved soft commutation circuit, however, it is desired that both forms of cushioning be provided to there provide protection against high $dv/dt$ and high $di/dt$ during commutating intervals of the power semiconductor.

Other objects, features and many of the attendant advantages of this invention will be appreciated more readily as the same becomes better understood by reference to the following detailed description when considered in connection with the accompanying drawings wherein like parts in each of the several figures are identified by the same reference character, and wherein.

Figure 1:
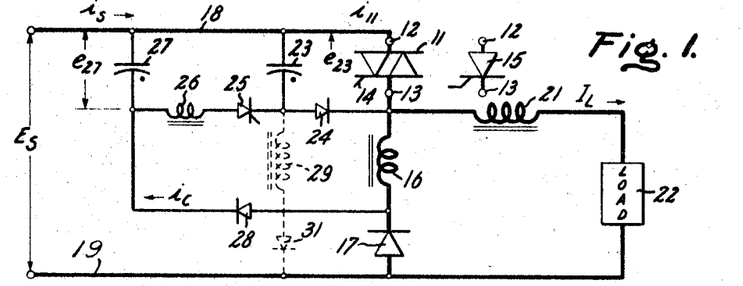
FIGURE 1 is a schematic circuit diagram of a new and improved time ratio control power circuit employing a soft commutation circuit constructed in accordance with the invention, and which provides protection against both high $dv/dt$ and high $di/dt$ during commutation intervals.

FIGURE 1 of the drawings is a schematic circuit diagram of a new and improved time ratio control power circuit constructed in accordance with the invention. The circuit shown in FIGURE 1 of the drawings includes a new and improved commutation circuit which provides for soft commutation of a power semi-conductor device employed to control electric power supplied to a load. In the circuit arrangement of FIGURE 1, a power semiconductor device shown at 11 comprises a gate controlled triac, bidirectional semiconductor device of the type recently made commercially available by the Semiconductor Products Department of the General Electric Company. The triac was first described in a paper appearing in the Journal of Applied Physics, vol. 30, No. 11, November 1959, pp. 1819 through 1824, by R. W. Aldrich and N. Holonyak, Jr., entitled, "Two-Terminal Asymmetrical and Symmetrical Silicon Negative Resistance Switches." The triac device in its most recent commercially available form has been described in a textbook entitled, Semiconductor Controlled Rectifier: Principles and Application of p-n-p-n Devices, by Gentry, Gutzwiler, Holonyak, and Von Zastrow, published by Prentice-Hall, Inc., Englewood Cliffs, N.J., and in a paper entitled, "Silicon Gate Controlled AC Switch and Its Applications," by H. F. Storm and D. L. Watrous, presented at the 1964 IEEE International Nonlinear Magnetic Conference, Apr. 6, 1964, in Washington, D.C. For a more complete description of the characteristics of this device, reference is made to the above-identified papers. Briefly, however, the triac device 11 is capable of conducting current in either direction depending upon the polarity of the potential across its load terminals 12 and 13 at the time that a gating on potential is applied to its control gate 14 by a suitable gating-on circuit (not shown). A number of gating-on circuits suitable for use with the triac 11 are disclosed in the Silicon Controlled Rectifier Manual, third edition, published by the Semi-conductor Products Department of the General Electric Company located at Electronics Park, Syracuse, N.Y. See, for example, chapter 4 of this manual. Briefly it can be stated, however, that if the potential of load terminal 12 of triac 11 is positive with respect to the load terminal 13, and a gating-on potential is applied to the control gate 14, load current will be supplied through the triac 11 in the direction from 12 to 13. Alternatively, if the load terminal 13 is positive with respect to the load terminal 12, then the load current flow will be from load terminal 13 to load terminal 12 upon a gating-on patential being supplied to the control gate 14. It should also be noted that in the circuit arrangement of FIGURE 1; the bidirectional conducting characteristics of triac 11 are not required and a conventional gate controlled silicon controlled rectifier illustrated schematically at 15 can be inserted physically in place of the triac 11, by connecting its lost terminals 12 and 13 in place of the correspondingly numbered load terminals of triac 11.

The load current carrying triac 11 is connected in series circuit relationship with a cushioning inductive reactor 16 and a coasting rectifier 17 across a pair of power supply terminals 18 and 19 which in turn are adapted to be connected across a source of electric potential. For convenience, the source of electric potential will be assumed to be a direct current power supply wherein the power supply terminal 18 is positive with respect to the power supply terminal 19. A filter inductor 21 and a load 22 are connected in series circuit relationship across the series connected cushioning inductor 16 and coasting rectifier 17. These elements comprise the main load current carrying elements of the time ratio control power circuit.

In order to commutate off the load current carrying power triac 11 at appropriate intervals, commutation circuit means are provided which include commutation capacitance means comprised by a first commutating capacitor 23 and blocking diode 24 connected in series circuit relationship across the load terminals of the triac device 11. The series circuit comprised by the commutating capacitor 23 and blocking diode 24 are connected in such a manner that the commutating capacitor is operatively coupled across the load terminals of the power triac device 11 and serves to limit the rate of rise of reapplied voltage across the device upon the device reverting to its blocking non-conducting condition. In order to cause the power triac device 11 to be turned off and returned to its blocking non-conducting condition, the juncture of the commutating capacitor 23 and blocking diode 24 is connected through an auxiliary commutating silicon controlled rectifier device 25 and a resonating inductor 26 to a second commutating capacitor 27 that comprises a part of the commutating capacitance means of the commutation circuit. The juncture of the second commutating capacitor 27 and resonating inductor 26 is connected through a feedback path including a feedback coupling diode 28 across the cushioning inductor 16. By this arrangement, the cushioning inductor 16 will serve to limit the rate of rise of load current ($di/dt$) through the power triac device 11 upon the device being turned on thereby preventing damage to the device due to high $di/dt$. If desired in certain circumstances, an auxiliary charging circuit comprised by a charging inductor 29 and charging diode 31 connected in series circuit relationship between the juncture of the first commutating capacitor 23 and blocking diode 24 and the power supply terminal 19, may be provided for assuring that the first commutating capacitor 23 is adequately charged prior to the commutating interval in order to assure that the commutation circuit completely commutates off the power triac device 11 during commutating intervals.

In operation, the soft commutation circuit of FIGURE 1 provides surge protection for the power semiconductor by the appropriate location and use of the cushioning elements of the commutating circuit. For convenience in the explanation of the operation of the circuit, it is assumed that the triac 11 is in its high impedance blocking or nonconducting condition following a preceding conducting interval, and that load current is being circulated through the load 22 by the filter inductor 21 and coasting rectifier 17 in conventional fashion. During this interval, the first commutating capacitor 23 is charged to substantially the full potential of the direct current power supply $E_s$ through diode 24, inductor 21 and load 22, with the polarity of the potential across the commutating capacitor 23 being negative at the dot. The second commutating capacitor 27 is similarly charged negative at the dot at the end of each commutation interval as will be explained more fully hereinafter. In the event that the circuit is operating at a substantially no load condition, then charging of the first commutating capacitor 23 can be accomplished through the charging inductor 29 and charging diode 31 inserted in the circuit for the purpose of allowing the circuit to operate under substantially no load conditions. With the circuit in this condition, the triac 11 is then gated on by the application of a suitable turn-on signal to its control gate 14.

Immediately after turn-on of the triac 11, buildup of load current through the triac 11 is limited by the cushion inductor 16 which prevents a large change in the rate of current buildup through triac 11 (large $di/dt$) thereby protecting the device against substantial damage. The cushioning inductor 16 also serves to limit the amplitude of the reverse current flowing through coasting rectifier 17 during this interval. Upon the load current through triac 11 reaching a value substantially equal to the load current flowing in load 22, the coasting rectifier 17 will stop conducting and block voltage. Also, it should be noted that upon turn-on of triac 11, the blocking diode 24 blocks and traps the charge on commutating capacitor 23. Subsequent to the coasting rectifier 17 turning off and assuming its blocking condition, the energy stored in the cushion inductor 16 will be transferred through the feedback means comprised in part by feedback diode 28 to the second commutating capacitor 27 to reverse the polarity of the charge across this capacitor. Thus, it can be appreciated that the energy developed in cushioning inductor 16 as a consequence of the cushioning effect it has during turn-on of triac 11, is not wasted, but is transferred back into the commutation circuit to be used for commutation off of the triac in a manner to be described more fully hereinafter. As a consequence of this action, this energy is not dissipated through the load with the resultant production of undesired current or voltage surges or overheating.

At this point in a cycle of operation, the circuit is in condition to be commutated off as determined by the control requirement which in turn are determined by the value of the load current to be supplied to load 22. Accordingly, when it is desired that the triac 11 be commutated off, the auxiliary commutating SCR 25 is turned on. The two commutating capacitors 23 and 27 and the resonating inductor 26 are tuned to series resonance at the desired commutating frequency, so that upon turn-on of the auxiliary commutating SCR 25, the charge of the two capacitors 27 and 23 oscillates through 180° and results in reversing the polarity of the potential across commutating capacitor 23 so that it now becomes positive at the dot. Upon this occurrence, the blocking diode 24 conducts thereby diverting load current from the triac 11 and reversing the polarity of the potential across its load terminals 12 and 13 resulting in turning it off. After commutation off of the triac 11, the forward voltage rises across triac 11 at a relatively low rate of rise of reapplied forward voltage ($dv/dt$) due to capacitor 23 which serves to limit the $dv/dt$ applied across triac 11. Communicating capacitor 23 is then re-charged in the previously described manner to initiate a new cycle of operation.

Figure 2:
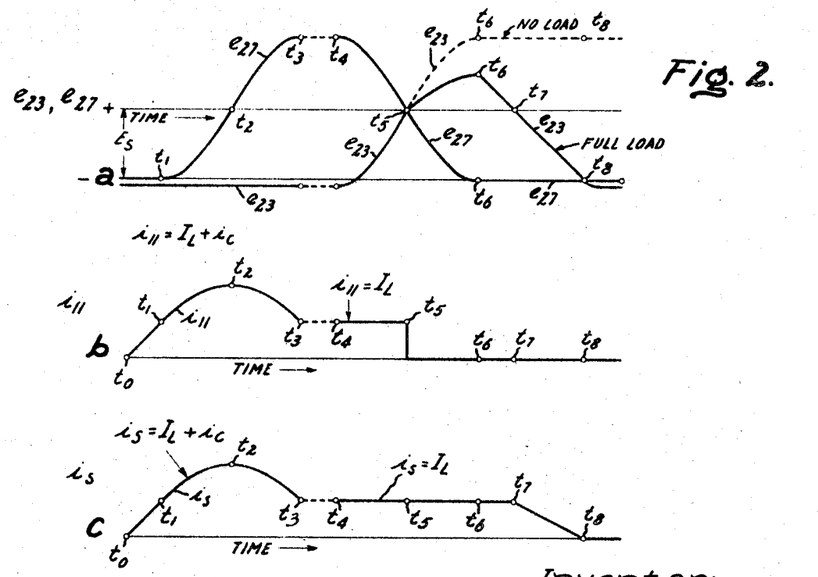
FIGURE 2, a series of voltage versus time operating characteristic curves illustrating the operation of the circuit shown in FIGURE 1.

The voltage and current waveforms at various points in the circuit of FIGURE 1 are shown in FIGURE 2 of the drawings, and facilitate an understanding of the operation of the circuit. Referring now to FIGURE 2 of the drawings, it is assumed that subsequent to time $t_8$ and prior to time $t_0$ at which point device 11 is turned on, the load current $I_L$ is being circulated through the load 22 and coasting rectifier 17 by the filter inductor 21. At time $t_0$, the triac device 11 is turned on and from time $t_0$ to time $t_1$, the current $i_{11}$ through the triac device as well as the current $i_s$ drawn from the supply voltage source $E_s$ increases from zero value to a value equal to the load current $I_L$ as shown in FIGURES 2b and 2c. Upon reaching this value at time $t_1$, coasting rectifier 17 blocks and the energy stored in the cushion inductor 16 is circulated through the feedback path including triac 11 and feedback diode 28 to second commutating capacitor 27 to reverse the polarity of the charge on the second communicating capacitor 27 as shown in FIGURE 2a of the drawings.

From an examination of FIGURE 2a, it can be seen that at time $t_1$, the potentials across the two commutating capacitors $e_{23}$ and $e_{27}$ are negative at the dot end of these capacitors. At time $t_1$ the potential $e_{27}$ of the second commutating capacitor 27 is oscillated through 180° during the time period from $t_1$ through $t_3$ to reverse the polarity of the charge across this capacitor so that it becomes positive at the dot end at time $t_3$. At time $t_2$ the charge from capacitor 27 is zero. It should be noted at this point that the cushion inductor 16 is designed so that the series circuit comprised by cushion inductor 16 and second commutating capacitor 27 is series resonant at the desired commutating frequency, and hence the cushion inductor 16 has a value of inductance about twice that of the resonating inductor 26. From an examination of FIGURES 2b and 2c of the drawings, it can be seen that during the interval of time that the polarity of the potential across the commutating capacitor 27 is being reversed, the supply current $i_s$ drawn from the supply is equal to the total value of the current $i_{11}$ flowing through triac 11 and the current $i_c$ flowing in the feedback path comprising the feedback diode 28. It should also be noted that this current as well as the current through triac 11 has a nice smooth sinusoidal waveshape having low $di/dt$.

As shown in FIGURE 2a of the drawings, at time $t_3$, the potential across the second commutating capacitor 27 has been reversed so that it is now positive at the dot end. At the $t_4$ the auxiliary commutating SCR 25 is turned on. The interval of time between $t_3$ and $t_4$ can be any value as determined by the control requirements and the requirements of load 22. Upon the auxiliary commutating SCR 25 being turned on at time $t_4$, the potential across the first commutating capacitor 23 is oscillated through 180° until it becomes positive at the dot side of capacitor 23 as explained previously. At time $t_5$, the value of this potential passes through zero. For no load conditions, the value of the potential $e_{23}$ across the commutating capacitor 23 is shown in dotted line form, and as illustrated, remains at substantially the full value of the supply potential. However, when load current is being drawn by the load 22, the requirements of the load prevent the value of potential $e_{23}$ across commutating capacitor 23 from reaching the full value of the supply potential, and it attains some intermediate value as shown by the solid line curve at time $t_6$. It should be noted, however, that his value is positive at the dot side of the capacitor so that blocking diode 24 is allowed to conduct and apply a reverse polarity potential across the load terminals of the triac 11 thus causing it to turn off. Concurrently with the reversal of potential $e_{23}$ across first commutating capacitor 23, the potential $e_{27}$ across the second commutating capacitor 27 is similarly oscillated through 180° so that it now again becomes negative at the dot side of the capacitor, and is conditioned for a new cycle of operation. From a comparison of FIGURES 2b and 2c to 2a, it can be seen that during the interval of time $t_4$ to $t_5$, the triac 11 continues to conduct load current. However, at time $t_5$ as the potential $e_{23}$ across the first commutating capacitor 23 commences to reverse polarity, current through the triac 11 drops to zero value, and commutation is achieved. Subsequently, the value of supply current $i_s$ continues to equal the load current $I_L$ for the interval of time $t_5$ to $t_7$ during which interval of time load current is being supplied from the first commutating capacitor 23 to load 22. At time $t_7$ the value of the potential across the first commutating capacitor 23 drops to zero value. Current drawn by load 22 will recharge the commutating capacitor 23 in the reverse direction so that it again becomes negative at the dot during the interval of time $t_7$ to $t_8$. After time $t_8$, the voltage across the commutating capacitor $a_{23}$ become slightly greater than the supply voltage $E_s$ by a value determined by the value of the inductances of the resonating inductor 26 and filter inductor 21, in accordance with the following relation: E is equal approximately to $$e_{23} = E_s \frac{(L_{26} + L_{21})}{L_{21}}$$

where $L_{26}$ is the inductance of the resonating inductor 26, and $L_{21}$ is the inductance of the filter inductor 21.

At no load conditions shown by the dotted line curve in FIGURE 2a (that is when $I_L = 0$), the voltage $e_{23}$ across the first commutating capacitor 23 rises at time $t_6$ to a value equal to approximately $E_s$, and after this time the voltage across commutating capacitor 23 will hold the triac 11 reserved biased so that it is maintained off. Under such circumstances, the first commutating capacitor 23 must be reset by the charging inductor 29 and charging diode 31 shown in dotted outline form. These elements should be included when it is intended that the circuit of FIGURE 1 be used under conditions such that the load current $I_L$ can drop to zero value.

Figure 3:
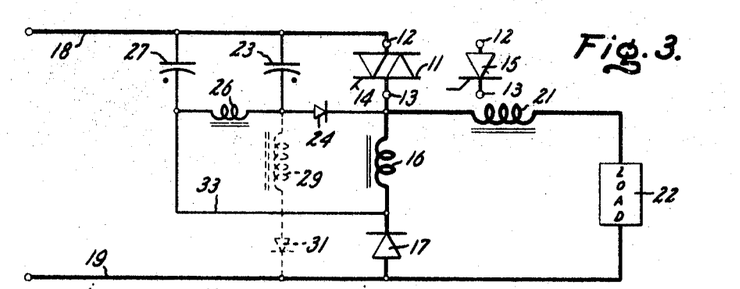
FIGURE 3 is a schematic circuit diagram of a modified form of the circuit shown in FIGURE 1, and which require one less gate controlled semiconductor device.
Figure 4:
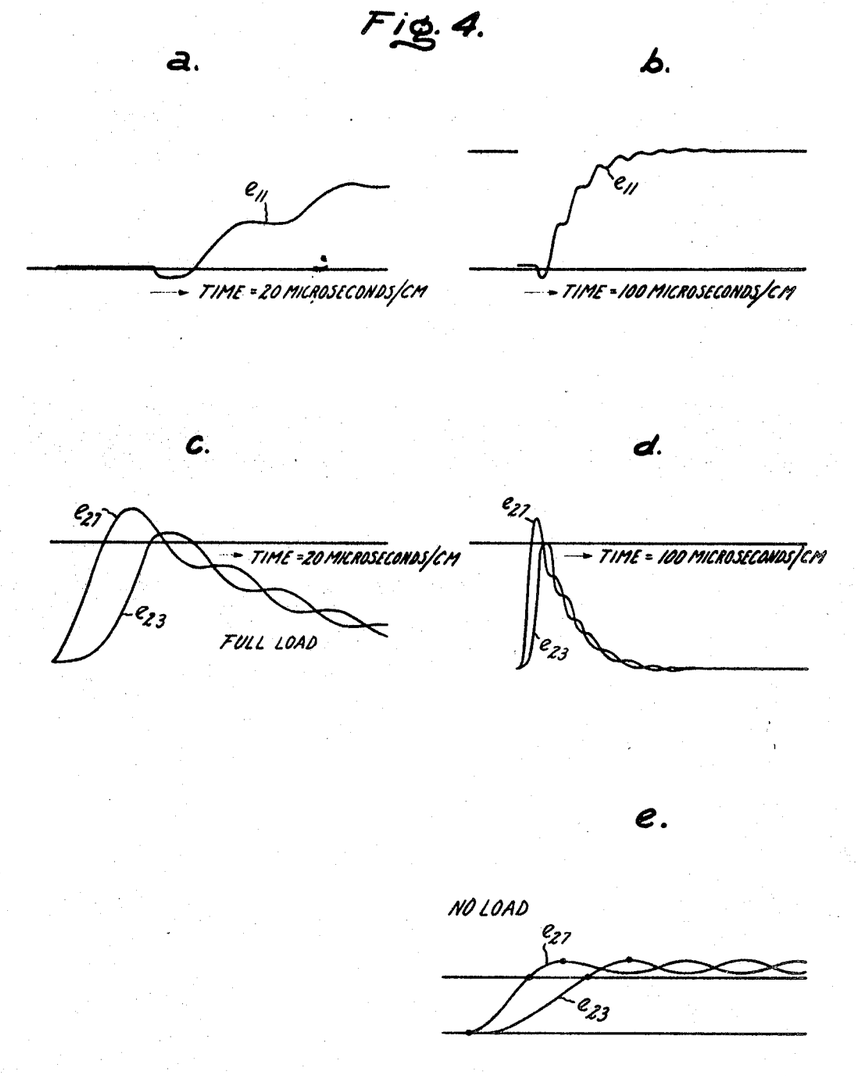
FIGURE 4 is a series of voltage waveshapes illustrating operating characteristics of the circuits shown in FIGURES 1 and 3.

The circuit shown in FIGURE 3 of the drawings is a simplified version of the circuit in FIGURE 1 with the difference that the auxiliary commutating SCR 25 and feedback diode 28 have been omitted and a simple conductor 33 comprises the feedback path connected between the cushioning inductive reactor 16 and the second commutating capacitor 27. The circuit in FIGURE 3 operates in a similar fashion to the circuit of FIGURE 1. For illustration, with the circuit of FIGURE 1, if the auxiliary commutating SCR 25 were turned on at the same time with triac 11, the two circuits would operate identically. The mode of operation of the two circuits would be different, however, in that the voltages appearing across the two commutating capacitors become intermingled in the manner shown in the voltage waveshapes illustrated in FIGURE 4 of the drawings. In FIGURE 4a, the voltage appearing across the triac 11 during the commutating interval is shown on a compressed time scale of 20 microseconds per centimeter. The same voltage waveshape on an enlarged time scale of 100 microseconds per centimeter is shown in FIGURE 2b wherein it can be appreciated that the reapplied forward voltage 11 appearing across triac 11 has a fairly linear waveform with a not too steep wavefront thus providing low $dv/dt$. The voltages appearing across the two commutating capacitors 23 and 27 are shown in FIGURE 4c on a compression time scale whereby it can be appreciated that the two voltages become so intermingled that it would be difficult to follow the operation during the commutating interval in the same manner as that used with relation to FIGURE 2 of the drawings. The same voltage waveshapes are shown on an enlarged time scale of 100 microseconds per centimeter in FIGURE 4d of the drawings. The voltage waveshapes shown in FIGURES 4c and 4d are for full load condition. For a no load condition, the voltage waveshapes $e_{27}$ and $e_{23}$ appearing across the two commutating capacitors 27 and 23 respectively are shown in FIGURE 4e of the drawings. In all other respects, the circuit shown in FIGURE 3 operates in a similar fashion to that of FIGURE 1.

It should be noted, however, that turn-on of the main load current carrying triac 11 in the FIGURE 3 circuit simultaneously initiates the commutation interval so that it is not possible to exercise independent control over the length of time that the triac 11 is allowed to remain on. This time interval will be fixed as determined by the parameters of the commutation circuit. Variation of the load current supplied to load 22 can be achieved then only by varying the rate of turn-on of the turn-on signal applied to the control gate 14 of triac 11 in the well-known time ratio control manner. For a further description of this principle, reference is made to the textbook entitled, Principles of Inverter Circuits, by B. D. Bedford and R. G. Hoft, published by John Wiley & Sons, Inc., New York, N.Y., Library of Congress Catalog Card No. 64–20078, and in particular to Chapter 10 of this text.

Figure 5:
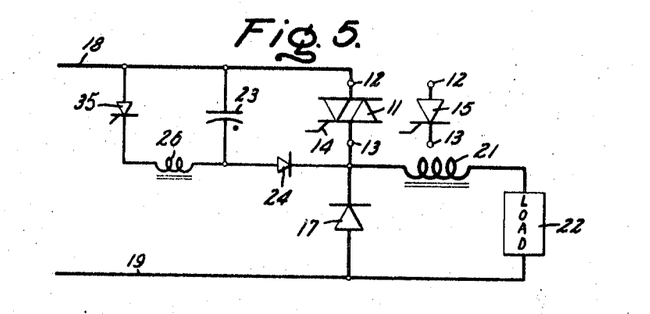
FIGURE 5 is still a different form of time ratio controlled power circuit which employs a form of a soft commutation circuit that provides protection against high $dv/dt$ only.

FIGURE 5 of the drawings illustrates a modified form of a new and improved time ratio control power circuit employing soft commutation wherein there is cushioning provided against large change of rate of current (high $di/dt$) through the device, but is designed to provide protection against large rates of reapplied voltage (high $dv/dt$). The circuit as shown in FIGURE 5 includes a power triac device 11 and a coasting rectifier 17 connected in series circuit relationship across a pair of power supply terminals 18 and 19. A load 22 and filter inductor 21 are connected in series circuit relationship across the coasting rectifier 17 in a conventional fashion. A source of gating on signals (not shown) would be connected to the control gate 14 of triac 11, and it should be noted that the circuit would operate equally well with a unidirectional conducting SCR such as that shown at 15, connected in place of triac 11 by connecting the load terminals 12 and 13 of SCR 15 to the correspondingly numbered terminals of the circuit shown in FIGURE 5.

Commutation off of the power triac 11 is achieved by a soft commutation circuit comprised by a commutating capacitor 23 and blocking diode 24 connected in series circuit relationship across the load terminals of the triac 11 in such a manner that one load terminal of the commutating capacitor is effectively coupled to one load terminal of the power semiconductor 11 or 15 whichever is connected in the circuit. By this arrangement, the commutating capacitor 23 will always serve to limit the rate of rise of reapplied voltage across the power triac 11 or SCR 15 after it has been commutating off. A resonating inductor 26 is provided which has one of its load terminals connected to the juncture of the series connected commutating capacitor 23 and blocking diode 24. In addition to this structure, coupling means are provided for operatively coupling the remaining terminal of the resonating inductor 26 in a closed series circuit loop with the commutating capacitor 23. In the circuit arrangement of FIGURE 5, this coupling means comprises an auxiliary commutating SCR 35 connected in series circuit relationship with the resonating inductor 26 across commutating capacitor 23 so that when the auxiliary SCR 35 is turned on, the resonating inductor 26 and commutating capacitor 23 are connected in a closed series circuit loop.

In operation, prior to turning on the power triac 11, commutating capacitor 23 is charged until the capacitor voltage equals the supply voltage and is negative at the dot side of the capacitor. Capacitor 23 is charged by current flowing through blocking diode 24, filter inductor 21, load 22 from the power source. Upon the triac 11 being turned on, blocking diode 24 blocks thereby preventing the charge on commutating capacitor 23 from being drained off. Triac 11 is then allowed to conduct for the period of time determined by the control requirements, and when it is desired to turn off the triac 11, the auxiliary commutating SCR 35 is turned on. Upon SCR 35 being turned on, the charge on commutating capacitor 23 is oscillated through 180° since the resonating inductor 26 and commutating capacitor 23 are tuned to series resonance at the commutating frequency. This results in reversing the polarity of the potential across the charging capacitor 23 so that it now becomes positive at the dot causing auxiliary SCR 35 to turn off. At the insant that the potential across commutating capacitor 23 begins to go positive at the dot, blocking diode 24 conducts and applies this reverse polarity potential across the load terminal of triac 11 and diverts load current from the triac so as to cause it to commutate off. Upon triac 11 being turned off, commutating capacitor 23 is again recharged negative at the dot, and this results in limiting the rate of rise of reapplied voltage across the triac 11 thereby providing $dv/dt$ cushioning.

Figure 6:
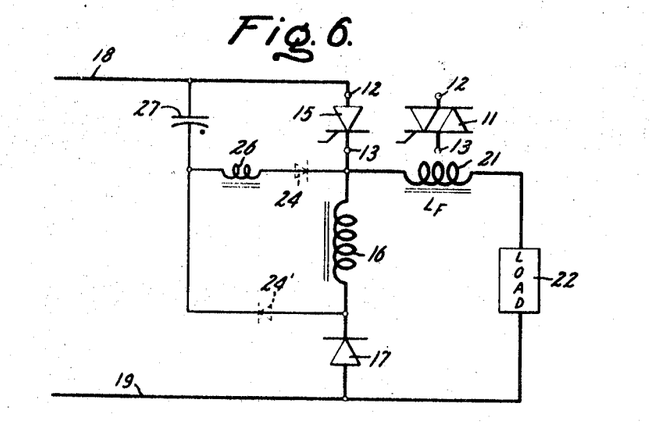
FIGURE 6 is a schematic circuit diagram of still another form of time ratio control power circuit constructed in accordance with the invention which provides only $di/dt$ cushioning and feedback of the reactor energy into the commutation circuit for use in the commutation operation.

FIGURE 6 of the drawings illustrates still another form of time-ratio control power circuit constructed in accordance with the invention. The time-ratio control power circuit shown in FIGURE 6 provides load current $di/dt$ cushioning for the gate controlled SCR 15 or triac 11 whichever is connected in the circuit by connection across the terminals 12 and 13. The circuit is further comprised by a cushioning inductor 16 and coasting rectifier 17 connected in series circuit relationship with the thyristor device 15 or 11 across the power supply terminals 18 and 19. The usual coasting inductor 21 and load 22 are connected across the series connected cushioning inductor 16 and coasting rectifier 17. A commutating capacitor 27 and resonating inductor 26 are connected in series circuit relationship across the thyristor device 15 or 11. It is possible to include in this series circuit a series connected blocking diode 24 shown in dotted outline, or alternatively, if desired the blocking diode may be located as shown at 24' in dotted outline form. Either one connection or the other is required, but in any event a feedback path must be provided from the cushioning inductor 16 back to the commutating capacitor 27. By this means, during operation as previously described in greater detail with respect to the circuits of FIGURES 1 and 3, the energy trapped in cushioning inductor 16 is fed back to commutating capacitor 27 to cause the charge on this capacitor to reverse its polarity and commutate off the thyristor device 15 or 11. The device is, of course, turned on by a suitable gating on signal applied to its gate electrode from a suitable gating signal source (not shown). By appropriate turning on and off the thyristor device 15 or 11, time ratio control over the power supplied to load 22 can be achieved.

Figure 7:
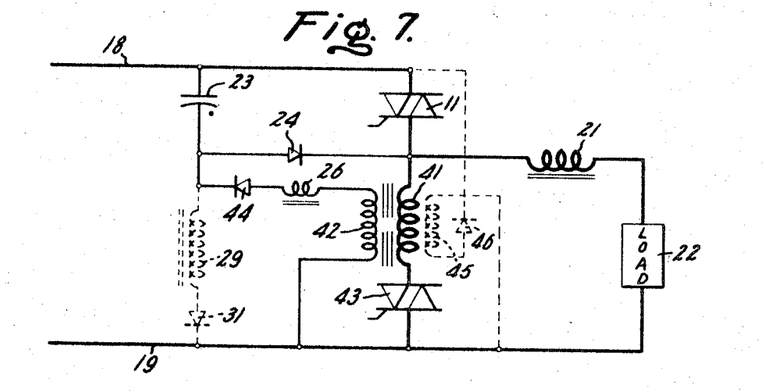
FIGURE 7 illustrates still a different form of time ratio controlled power circuit employing soft commutation, and which allows for pumping current in either of two directions to the load or from the load.
Figure 14:
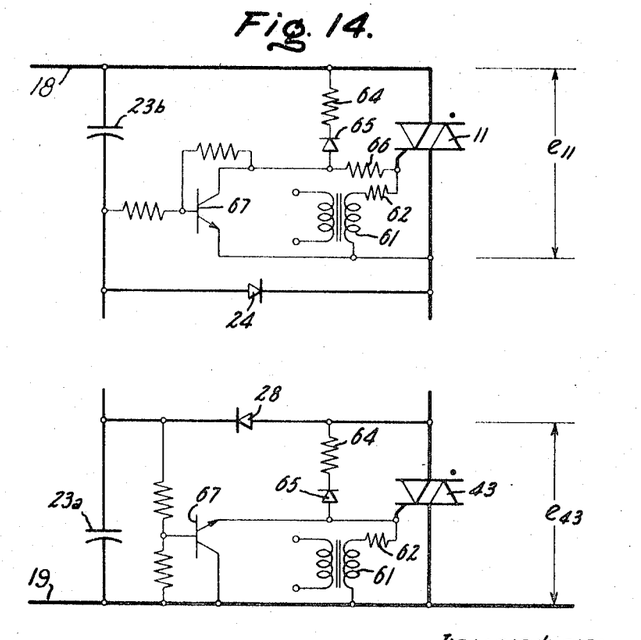
FIGURE 14 illustrates a perfered form of gating circuit for use with the circuits of FIGURES 9–13.

FIGURE 7 of the drawings illustrates a modified version of the new and improved time ratio control power circuit wherein a second triac bidirectional conducting device 43 is inserted in place of the coasting rectifier 17 along with certain other components, and provides control over the commutation interval for the main load current carrying triac 11. For this purpose, the main load current carrying triac 11 is connected in series circuit relationship with the primary winding 41 of a transformer having two inductively coupled secondary windings 42 and 45. A coasting triac bidirectional conducting device 43 is connected in series circuit relationship with the primary winding 41 and triac 11 with the series circuit thus comprised being connected across the power supply terminals 18 and 19. A conventional filter inductor 21 and load 22 are connected in parallel across the series connected primary winding 41 and coasting triac 43. Appropriate gating on circuits are operatively coupled to the control gates of each of the triacs 11 and 43 for gating on these triacs at appropriate times in an operating cycle. Suitable gating circuits for this purpose are illustrated in FIGURE 14 of the drawings and will be described more fully hereinafter. Once the load current carrying triac 11 has been gated on, it is commutated off by a soft commutation circuit means which includes a commutating capacitor 23 and blocking diode 24 which are connected in series circuit relationship across the load terminals of triac 11. The juncture of the commutating capacitor 23 and blocking diode 24 are connected through a feedback diode 44 and resonating inductor 26 to the secondary winding 42 of transformer 41 and 42, and the series circuit thus comprised is connected between the power supply terminal 19 and the juncture of commutating capacitor 23 and blocking diode 24. For certain conditions of operation, that is, at low load currents or for no load operating conditions, a charging inductor 29 and charging diode 31 shown in dotted outline form are connected between the juncture of the commutating capacitor 23 and blocking diode 24 to assure that the commutating capacitor 23 is fully charged between each commutating interval. In addition, in order to assure that the potential across the main load current carrying triac 11 does not reach excessive values, a clamping circuit may be provided which includes the additional secondary winding 45 and a coupling diode 46 connected in series circuit relationship across the power supply terminals 18 and 19 as shown in dotted outline form.

In operation, assuming both triacs 11 and 43 to be in their blocking, non-conducting condition, then the commutating capacitor 23 will be charged negative at the dot to essentially the full potential of the power supply by current drawn through the load 22. In the event that the circuit is operating in a no load condition, then this charging would take place as the result of the action of the charging inductor 29 and blocking diode 31. With the circuit in this condition, a gating on potential is then applied to the triac 11 causing it to turn on and supply load current to the load 22. The interval of time that the triac 11 is left on is determined by the control requirements. When it is desired to commutate off the triac 11, the coasting triac 43 is turned on by a suitable gating on signal supplied to its control gate. Upon this occasion, current is drawn through the primary winding 41, and results in oscillating the charge on the commutating capacitor 23 through 180° so as to reverse the polarity of the charge and cause it to go positive at the dot side. This oscillation takes place through the closed series circuit loop comprised by capacitor 23, feedback diode 44, resonating inductor 26, the primary and secondary winding 42 and triac 11. As the potential across the commutating capacitor 23 starts to go positive at its dot side, diode 24 conducts causing load current to be diverted from the triac 11 and apply a reverse polarity potential across this triac which turns it off. Subsequently, the commutating capacitor 23 is recharged through triac 43, primary winding 41, blocking diode 24, assuming that the charging inductor 29 and charging diode 31 are not in the circuit. Upon the commutating capacitor 23 reaching its fully charged condition negative at the dot, the triac 43 will be turned off automatically. Almost concurrently, a suitable gating on signal is applied to its control gate to cause it to again conduct in the reverse direction so as to cause it to continue to supply load current to the load 22 and filter inductor 21 in a conventional coasting rectifier fashion. Coasting triac 43 will then continue to conduct until such time that the main load current carrying triac 11 is again gated on, and the current drawn through triac 11 attains the value of the load current. Upon this occasion coasting triac 43 will again turn off automatically in the same fashion as the coasting diode 17 described with relation to FIGURE 1 of the drawings. The load current flowing reversely through the primary winding 41 during the coasting interval will reset the flux in the core of the transformer comprised by windings 41 and 42 so as to condition the circuit for a new cycle of operation. Prior to the time that the flux of the transformer 41 and 42 is reset to negative saturation due to reverse load current flow through triac 43, excessive voltages may be developed across the main load current triac 11. In order to avoid such a condition, a clamping winding 45 and coupling diode 46 are connected across the power supply terminals 18 and 19 in the manner shown, and will prevent the application of excessive voltages by clamping the potential across triac 11 to the value of the supply potential.

Figure 8:
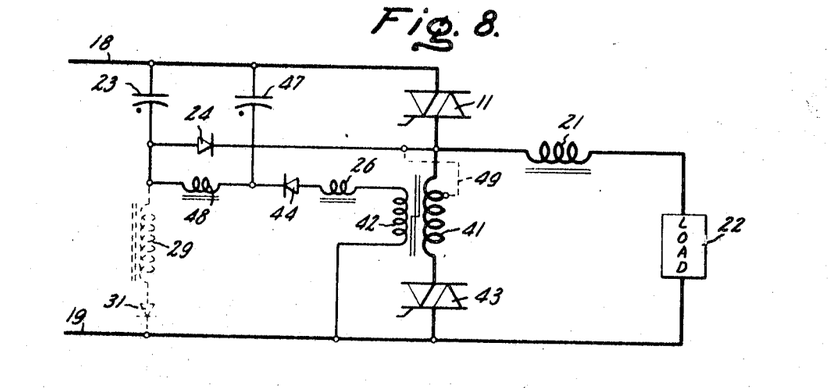
FIGURE 8 is a schematic circuit diagram of a modified form of the circuit shown in FIGURE 7.

The time ratio control power circuit shown in FIGURE 8 of the drawings is similar in many respects to the circuit of FIGURE 7 and operates in a similar fashion with the notable exception that transformer 41 is a saturating transformer and the resonating inductor is split into two parts 26 and 48, each of which is about half the size of the inductor 26 in the FIGURE 7 circuit. Also, a second commutating capacitor 47 is provided which is connected between the power supply terminal 18 and the juncture of the second resonating inductor 48 and feedback diode 44. Here again, the two commutating capacitors 23 and 47 are each about one-half the value of the single commutating capacitor 23 employed in the FIGURE 7 circuit. In all other respects, the circuit in FIGURE 8 is similar to the circuit in FIGURE 7.

In operation, the circuit in FIGURE 8 functions in a manner similar to that described with relation to the FIGURE 1 and FIGURE 3 circuits in that initially the polarity of the charge on the second commutating capacitor 47 is first reversed and then oscillates the polarity of the charge on the first commutating capacitor 23 to thereby commutate off the power triac 11. Again, commutation is initiated by turn-on of the coasting triac 43 in a manner similar to the FIGURE 7 circuit. The main difference in operation of the two circuits is that the current flowing in the primary winding 41 is dropped to near zero during the initial inrush of current through triac 43, and winding 41 is unsaturated. As a result the burden on the commutating circuit is greatly relieved, and allows the commutation circuit to be more effective in turning off triac 11. This is in contrast to the circuit arrangement of FIGURE 7 wherein the primary winding current adds to the load current and burdens the commutation operation. Here again, a charging inductor 29 and charging diode 31 may be used to assure that the commutating capacitors 23 and 47 are recharged to their full value or in each commutation interval. Also if necessary a clamping winding and clamping diode (not shown) may be added to the transformer 41, 42 for limiting the value of the voltage applied across triac 11 during reset of the transformer 41, 42. Alternatively, if desired, the blocking diode 24 could be connected in the manner indicated by the dotted line 49 back to an intermediate tap point on the primary winding 41 so that its current could be used to reset the core of the transformer during the commutation interval thereby assuring that the circuit will be in condition for another cycle of operation immediately after commutation.

Figure 9:
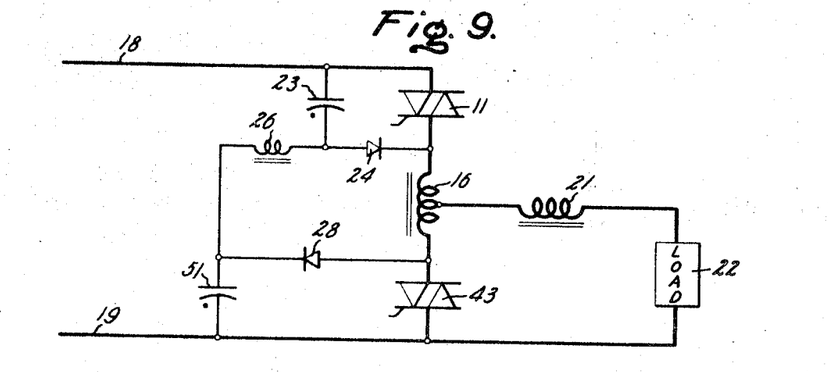
FIGURE 9 is a schematic circuit diagram of still a different type of two way time ratio control power circuit wherein commutation of one load current carrying semiconductor device is initiated by turn-on of an opposite device and vice versa.

FIGURE 9 of the drawings illustrates a new and improved time ratio control power circuit constructed in accordance with the invention which is capable of a two-way power flow. In the circuit arrangement of FIGURE 9, a pair of triac gate controlled bi-directional conducting devices 11 and 43 are connected in series circuit relationship with a cushioning inductor 16 across a pair of power supply terminals 18 and 19. A mid-tap point of the cushioning inductor 16 is connected through a filter inductor 21 and load 22 across the triac device 43. A first commutating capacitor 23 and blocking diode 24 are connected in series circuit relationship across the triac device 11. A coupling diode 28 and resonating inductor 26 are connected in series circuit relationship between the juncture of the commutating capacitor 23 and blocking diode 24 and the juncture of the triac 43 and cushioning inductor 16 for feeding back energy trapped in the cushioning inductor 16 into the commutating capacitor 23. A second commutating capacitor 51 is connected between the power supply terminal 19 and the juncture of the coupling diode 28 and resonating inductor 26.

As a consequence of the above construction, the circuit arrangement of FIGURE 9 is capable of pumping power from a power source (not shown) connected across the power supply terminals 18 and 19 into the load 22, or alternatively, assuming the load 22 to be capable of generating electric power as, for example, occurs with the traction motors of an electric driven vehicle, the circuit is capable of pumping power back from the load 22 into the power supply connected across the terminals 18 and 19. This might be done for example for the purpose of conserving the energy developed during coasting of the vehicle.

While the circuit of FIGURE 9 is operated in its first mode of operation, that is, where it is supplying electric power to the load 22, the triac 11 will be turned on by a suitable gating circuit (not shown) to supply load current to the load 22 and will be commutated off after a predesigned interval of conduction in precisely the same manner as the circuit arrangement shown in FIGURE 3 of the drawings. That is to say, during the intervals that the triac 11 is off, commutating capacitor 23 will be charged negative at the dot side through blocking diode 24. Upon the triac 11 being turned on, the charge on capacitor 23 is oscillated 180 degrees through the closed series circuit loop comprised by triac 11, cushioning inductor 16, coupling diode 28 and resonating inductor 26 to reverse the polarity of the charge on the commutating capacitor and thereby cause triac 11 to turn off. Immediately after the turn off of triac 11, triac 43 is turned on to function in the manner of a coasting diode so as to circulate load current through load 22 and filter inductor 21. Successive cycles of operation of the circuit will then follow in similar fashion as the circuit shown in FIGURE 3 of the drawings.

When it is desired to operate the circuit of FIGURE 9 to pump power back from the load 22 into the power supply source, the triac 43 is turned on and off at a fast rate so as to cause, during its on period, load current to flow from load 22 through filter inductance 21 and triac 43. After a predesigned interval of time, the triac 43 will be commutated off by the commutating components comprising cushioning inductor 16, diode 24, and resonating inductor 26 and second commutating capacitor 51 by reversing the polarity of the charge on second commutating capacitor 51 and cause triac 43 to be turned off. Immediately subsequent to the turn-off of triac 43 in each operating cycle, triac 11 is turned on by its gating source so as to feed back into the power supply the energy trapped in the filter inductor 21. After a predetermined interval, this energy will drop to a sufficiently low level that the polarity of the potential across triac 11 will be reversed, and triac 11 will commutate off automatically. Thereafter, the circuit is conditioned for a new cycle of pump-back operation.

Figure 10:
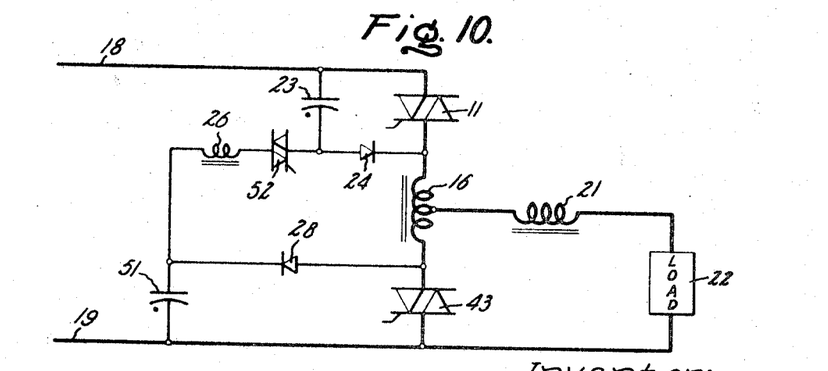
FIGURE 10 is a schematic circuit diagram of a modified form of the circuit shown in FIGURE 9.

FIGURE 10 of the drawing illustrates an embodiment of the circuit shown in FIGURE 9 wherein a third gate controlled bi-directional conducting device 52 is inserted in the commutating circuit in series with the resonating inductor 26. The addition of the third triac 52 provides independent control over the interval of time that the triacs 11 and 43 are allowed to conduct in each cycle of operation. Otherwise, the circuit of FIGURE 10 will operate in a similar fashion to the circuit of FIGURE 9. Turn-on of the third triac device 52 will initiate commutation of either the triac 11 or triac 43 whichever one is conducting.

Figure 11:
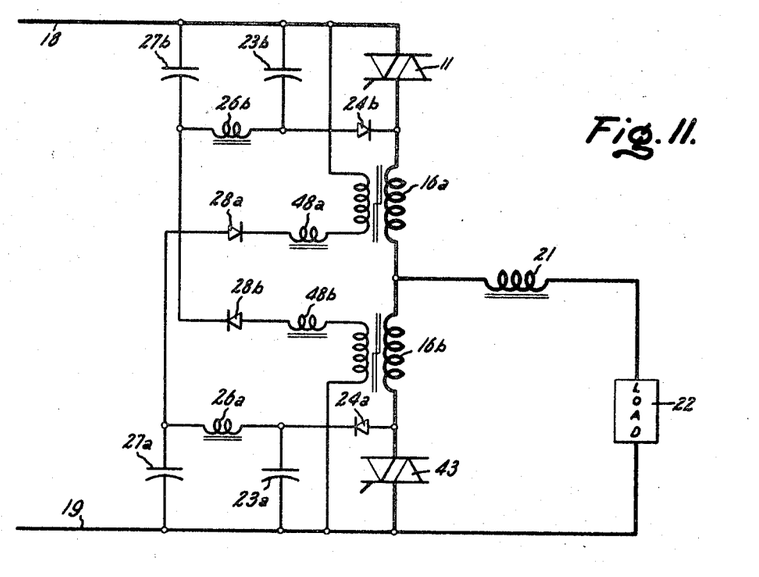
FIGURE 11 illustrates still a different form of two-way time ratio control power circuit.

FIGURE 11 of the drawings illustrates a new and improved time ratio control power circuit constructed in accordance with the invention. This circuit is capable of two-way power flow, and similar to the circuit of FIGURE 10 allows the on time of the triacs 11 and 43 to be controlled but does not require a third triac device to accomplish such control. With the circuit of FIGURE 11, commutation of the triac 11 is controlled by turn-on of triac 43 during the mode of operation while load current is being supplied to load 22, and turn-on of the triac 11 will initiate the commutation of the triac 43 when the load 22 is supplying power back to the power supply source.

During the first mode of operation when the time ratio control power circuit is supplying current to load 22 through triac 11, commutation of triac 11 is achieved by turn-on of triac 43 which acts through the commutating elements 16b, 48b, 28b, 27b, 23b, 26b, and 24b, to turn off triac 11 in a manner similar to the circuit arrangement of FIGURE 8. During the interval that the triac 11 is conducting, the saturable transformer 16a is saturated so as to render the commutating elements 48a, 28a, 27a, 26a, and 23a inactive. Reset of the saturable transformer 16b after commutation of triac 11 is achieved by the load current flowing through the load 22 and filter inductance 21 back up through the triac 43 in the reverse or coasting direction.

During the pump-back mode of operation of the circuit shown in FIGURE 11, the reverse situation is true. Triac 43 is turned on and off alternately at a fast rate to achieve pump-back of power to the power supply source. Turn-on of the triac 43 is achieved by a suitable gating circuit to be described with relation to FIGURE 14. Turn-off is achieved by turn-on of the triac 11 which operates through the saturable transformer 16a and the elements 48a, 28a, 27a, 26a, 23a, and 24a to commutate off triac 43 in a manner similar to the circuit arrangement of FIGURE 8. During the interval of time that the triac 43 is conducting, the saturable transformer 16b will be driven into saturation and its associated commutating elements will be rendered inactive. After commutating the triac 43, the transformer 16a is driven into saturation allowing current to be pumped back into triac 11 until such time that the reversal of the potential across the load terminals of triac 11 causes it to turn off, after which event the circuit is in condition for a new cycle of operation.

Figure 12:
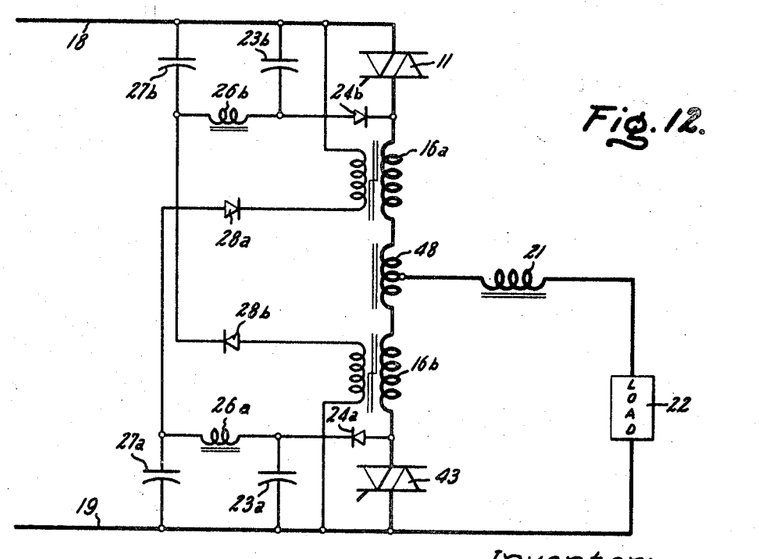
FIGURE 12 is a modified form of the circuit shown in FIGURE 11.

The circuit arrangement of FIGURE 12 is identical in construction and operation of the circuit of FIGURE 11 with the exception that a single center tapped inductor 48 is used in place of the two small resonating inductors 48a and 48b of the circuit shown in FIGURE 11. In all other respects the circuits are the same.

Figure 13:
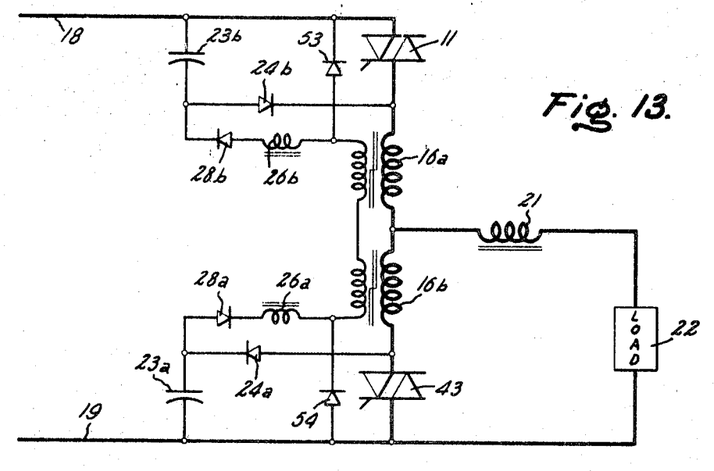
FIGURE 13 is a schematic circuit diagram of still another form of the circuit arrangement shown in FIGURE 11.

FIGURE 13 of the drawings illustrates a time ratio control power circuit which is similar to the circuits of FIGURES 11 and 12 with the exception that the saturated inductance of the two coupling transformers 16a and 16b is used to replace the single inductance 48 of the FIGURE 12 circuit arrangement, or the two small inductors 48A and 48B of the FIGURE 11 arrangement. In addition, by the inclusion of the two diodes 53 and 54 in each of the respective commutating circuit branches, it is possible to use the saturation time of the coupling transformer 16b to control the on time of the triac 11, and to use the saturation time of coupling transformer 16a to control the on time of the triac 43. With the arrangement of FIGURE 13, while the load current is being supplied to the load 22, coupling transformer 16a remains saturated, and likewise its saturated inductance is provided in place of the inductor 48 in the commutating action.

The length of time that the triacs 11 and 43 of the time ratio control power circuit shown in FIGURE 13 are allowed to remain on, can be determined by proper design of the saturable coupling transformers 16a and 16b. Considering first that the time ratio control circuit of FIGURE 13 is driving the load 22, and that the coupling transformer 16a remains saturated, the time that triac 11 remains on is short if the primary and secondary turns in coupling transformer 16b are equal. Upon the triac 11 being turned on, primary current of transformer 16b flows through capacitor 23a and diode 24a with secondary current through the diode 54, inductor 26b, diode 28b and commutating capacitor 23b. With such an arrangement, the two commutating capacitors 23a and 23b are charged simultaneously, and commutation can then be initiated rapidly.

A longer on time for the triac 11 can be provided by making the number of secondary turns small compared to the primary turns of coupling transformer 16b. With such an arrangement, the charging of commutating capacitor 23b and 23a is delayed long enough to allow the coupling transformer 16b to saturate. After coupling transformer 16b saturates, capacitor 23b is charged by the saturated inductance of both coupling transformers through the diode 54. Thereafter, commutating capacitor 23a is charged through diode 28a, inductor 26a, the secondary winding of coupling transformer 16b, inductor 26b, and diode 28b. This current finally will reset the coupling transformer 16b and then commutate triac 11. The reverse operation will provide commutation for triac 43 during the pump-back mode of operation.

FIGURE 14 of the drawings illustrates suitable gating on circuits for the triacs 11 and 43 for use in the circuit arrangements shown in FIGURES 7–13. Since the construction and operation of the gating circuit associated with triac 11 is essentially the same as that of the gating circuit associated with triac 43, only one will be described. The manner of connection of the gating circuits to the two different triacs will differ however as illustrated in the drawing due to the differences in supply potential polarities, but it is believed that the description of one will suffice for both. In the instance of triac 11, gating on signal pulses are supplied through a gating transformer 61 whose secondary winding is connected through limiting resistor 62 to the control gate of triac 11. Gating on signal pulses applied through the pulse transformer 61 will cause the triac 11 to turn on whenever the potential across triac 11, $e_{11}$ is positive at the dot relative to its opposite terminal. However, should the potential across triac 11 reverse so that it is now negative at the dot side relative to its opposite terminal, a gating on signal pulse will be coupled through the limiting resistors 64, 66 and blocking diode 65 to the control gate of triac 11 causing it to turn on. Under these conditions, current will be conducted through triac 11 in a reverse or pump-back direction. During commutation off of triac 11, it is essential that no gating on signal pulse be allowed to be applied to the control gate. For this purpose, a clamping transistor 67 is suitably coupled between the control gate of triac 11 and its load terminal normally identified as its cathode so as to clamp the control gate to the potential of the cathode and prevent its turn-on during the commutation intervals. To assure operation in this manner, the base of transistor 67 is coupled through a suitable limiting resistor to sense the potential across the commutating capacitors 23b or 23a to assure proper operation of the circuit.

Figure 15:
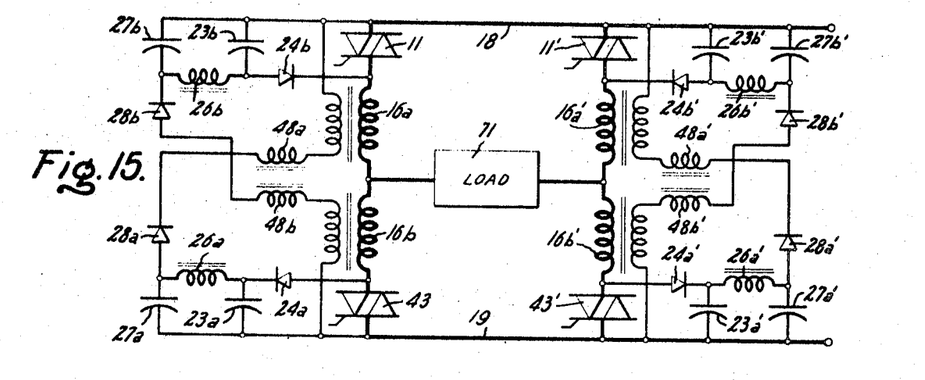
FIGURE 15 is a schematic circuit diagram of a basic triac inverter employing soft commutation in accordance with the present invention.

FIGUE 15 of the drawings illustrates a new and improved DC to AC power inverter constructed in accordance with the invention for converting the direct current electric potential supplied across the supply terminal 18 and 19 to an alternating current potential applied across the load 71. For this purpose, the load 71 is connected between the mid-tap points of two sets of two series connected triac bidirectional conducting devices. One of the sets is comprised by a triac 11 connected in series circuit relationship with the primary winding 16a of a first coupling transformer, the primary winding 16b of a second coupling transformer and with a second triac bidirectional conducting device 43. The second set of series connected triacs are comprised by a third triac bidirectional conducting device 11' connected in series circuit relationship with the primary winding of a third coupling transformer 16a', the primary winding of a fourth coupling transformer 16b' and a fourth triac bidirectional conducting device 43'. The commutating circuits associated with each of the triacs 11 and 11', 43, 43' are identical to the commutating circuit arrangement shown in FIGURE 11 of the drawing and operate in precisely the same manner to commutate off their respective associated triac devices. The gating circuits (not shown) associated with each of the triacs are arranged so that the triacs 11 and 43' are first gated on and then turned off by their commutating circuits, and subsequently the triacs 11' and 43 are gated on then turned off by their associated commutating circuitry. By operation of the circuit in this manner, an alternating current potential is developed across the load 71. Since the operation of the commutation circuits was explained in detail in connection with FIGURE 11 of the drawing, a further explanation of the manner of operation of this circuit is believed unnecessary.

Figure 16:
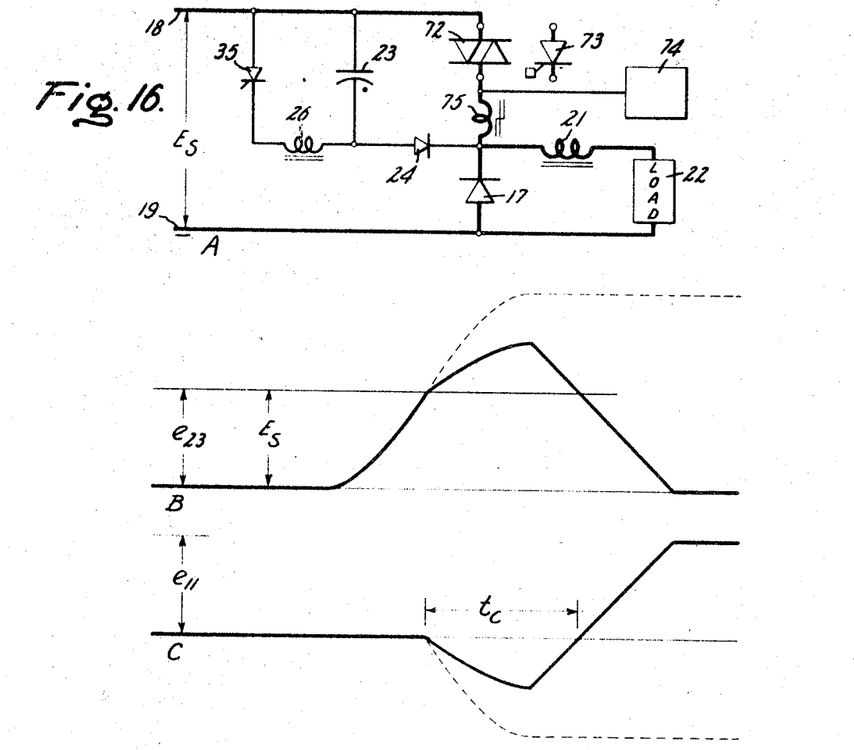
FIGURE 16 is a schematic circuit diagram of a time ratio control power circuit employing either diacs or $dv/dt$ fired SCR's and providing soft commutation in accordance with the invention.
Figure 18:
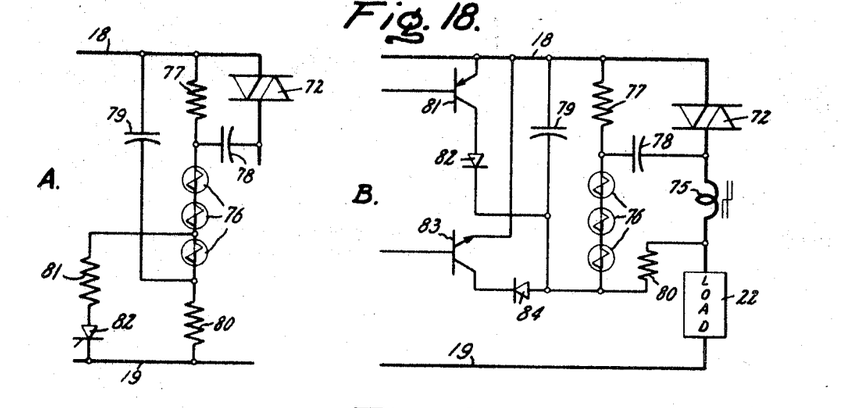
FIGURES 18A and 18B are schematic circuit diagrams of suitable gating circuits for the TRC circuits of FIGURES 16 and 17.

A diac version of a new and improved time ratio control power circuit constructed in accordance with the invention is shown in FIGURE 16. In this circuit arrangement of FIGURE 16, a diac bidirectional conducting device 72 is employed in place of either a triac or silicon controlled rectifier for controlling load current flow to the load 22 in accordance with the well known time ratio control principle. Alternatively, if desired a $dv/dt$ fired SCR illustrated at 73 may be used in place of the diac 72. The $dv/dt$ fired SCR 73 is of the type which is driven into conduction by sharply raising the potential across the load terminals of the device with the gating electrode being maintained open circuited. Commercially available SCR's may be used in this manner, however, there are available on the market today from the Semiconductor Products Department, General Electric Company, especially designed silicon controlled rectifier control units for use with the $dv/dt$ firing circuitry. The diac device is a two terminal bi-directional conducting device which is described more fully in the above-mentioned "Journal of Applied Physics" article by Aldrich and Holonyak. The diac 72 or the $dv/dt$ fired SCR 73 whichever is employed is turned on or rendered conductive by a $dv/dt$ firing circuit 74 which will be described more fully hereinafter in connection with FIGURE 18 of the drawing. The diac 72 or $dv/dt$ fired SCR 73 is connected in series circuit relationship with a small cushioning inductor 75 and with a coasting rectifier 17 across the power supply terminals 18 and 19 in conventional fashion. The remainder of the circuit is identical to the time ratio control circuit described with relation to FIGURE 5 of the drawings.

In operation, once the diac or $dv/dt$ fired SCR 73 has been turned on, it will be commutated off by the commutating circuit elements which function in previsely the same manner as was described with relation to the circuitry shown in FIGURE 5. It might be noted that the on-time of the diac 72 or $dv/dt$ fired SCR 73 can be controlled by independent control of the turn-on time of the auxiliary commutating SCR 35. FIGURE 16B of the drawings illustrates the voltage wave shapes appearing at various points in the circuit of FIGURE 16. From an examination of FIGURES 16B and 16C, it can be appreciated that the potential across the commutating capacitor 23 illustrated as $e_{23}$ remains negative on the dot side until commutation is initiated by turning on the commutating SCR 35. Thereafter, the charge on commutating 23 is oscillated through 180° by the series circuit comprised by the commutating capacitor 23, commutating SCR 35 and resonating inductor 26 during the interval $t_c$ shown in FIGURE 16c. During this interval, the diac or $dv/dt$ SCR fired will become commutated off.

Figure 17:
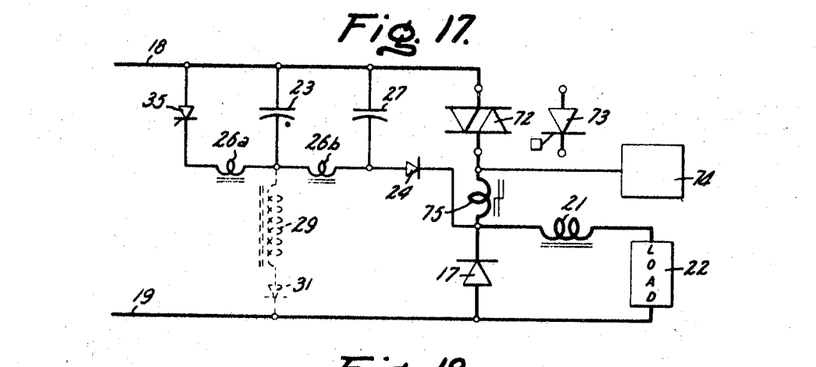
FIGURE 17 illustrates a modified form of the circuit shown in FIGURES 16.

FIGURE 17 of the drawing illustrates a different embodiment of a diac or $dv/dt$ fired SCR time ratio control power circuit constructed in accordance with the invention. The circuit arrangement of FIGURE 17 operates in essentially the same manner as FIGURE 16 with the exception that it employs a commutation circuit arrangement which is similar to the circuit described with relation to FIGURE 3 of the drawings. In the circuit of FIGURE 17 the charge on the commutating capacitor 23 is first oscillated out into the commutating capacitor 27 and then applied across the diac 72 or $dv/dt$ fired SCR 73 to cause it to commutate off. In all other respects, the operation of the circuits shown in FIGURES 16 and 17 are similar.

FIGURE 18A of the drawing illustrates one suitable form of a gating on circuit for the diac device 72 or alternatively for the $dv/dt$ fired SCR's 73 if they are employed. The firing circuit arrangement of FIGURE 18A employs a string of snap switches otherwise known as Shockley diodes 76 connected in series circuit relationship with a pair of limiting resistors 77 and 80 across the power supply terminals 18 and 19. The juncture of the limiting resistor 77 and the string of Shockley diode 76 is coupled through a coupling capacitor 78 to one load terminal of the diac 72 with the remaining load terminal of diac 72 being conneced directly to the power supply terminal 18. A pulsing capacitor 79 is connected intermediate the power supply terminal 18 and the juncture of the limiting resistor 80 with the string of snap switches 76. To control the turn-on of snap switches 76, an intermediate juncture point of the string of snap switches is connected through a limiting resistor 81 and small gating SCR 82 back to the power supply terminal 19. In operation, upon the application of a turn-on signal to the control gate of the small gating SCR 82, the snap switches or Shockley diodes 76 will be driven into conduction so as to effectively couple the pulsing capacitor 79 directly through coupling capacitor 78 across the diac 72 to thereby drive it into conduction.

FIG. 18B of the drawings illustrates a control circuit for gating on diac 72 to control two-way current flow through the device. For this purpose, the string of snap switches 76 is connected in parallel with diac 72 through the two limiting resistors 77 and 80 with the juncture of the resistor 77 and snap switches 76 being coupled through coupling capacitor 78 to one load terminal of the diac 72. A charging or pulsing capacitor 79 has its charging rate controlled through either one of two control transistors. A first control transistor is comprised by a first PNP junction transistor 81 having its collector connected through a blocking diode 82 to one terminal of the charging capacitor 79 and having its emitter connected to a power supply terminal 18. The base of the control transistor 81 is connected to a suitable source of gating on signals. A second control NPN junction transistor 83 is provided which has its emitter connected directly to the power supply terminal 18 and has its collector connected to a blocking diode 84 to the pulsing capacitor 79. By constructing the pulsing circuit in this manner, either one of the control transistors 81 or 83 can be employed to control the charging rate of the pulsing capacitor 79 and to cause it to break down the snap switches 76 thereby rendering the diac 72 conductive in either one of two different directions depending upon the polarity of the potentials across the load terminals of the diac.

Figure 19:
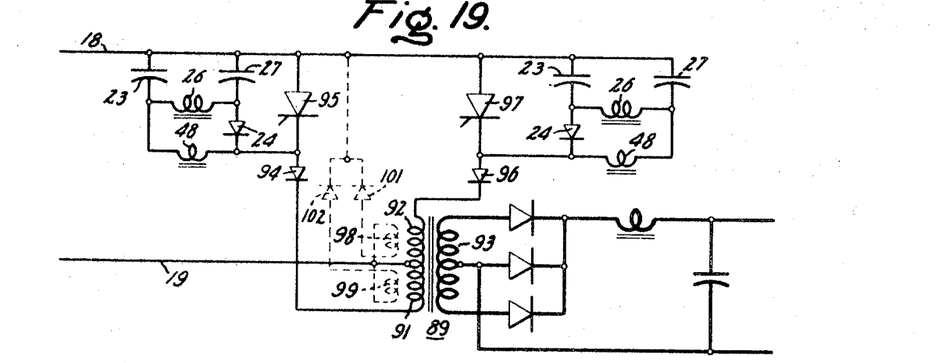
FIGURE 19 is a schematic circuit diagram of a transformer coupled time ratio control circuit constructed in accordance with the invention and providing soft commutation.

FIGURE 19 of the drawings illustrates a transformer coupled time ratio control circuit constructed in accordance with the invention. In this circuit, a high frequency transformer shown at 89 has the center tap point of its primary winding connected directly to the power supply terminal 19 so as to divide the primary into two winding halves 91 and 92. These are inductively coupled to a secondary winding 93 connected through a conventional rectifier and filter network to an output load. The primary winding half 91 has its remaining free terminal connected through a coupling diode 94 and load current carrying SCR 95 to the power supply terminal 18. Similarly, the winding half 92 is connected through a coupling diode 96 and second load current carrying SCR 97 for turning these SCR's on alternately at a rate determined by the load requirements. Commutating circuit arrangements comprised by the elements 23, 26, 27, 24, and 48, and coupled across each of the SCR's 95 and 97. The commutating circuit arrangements operate in essentially the same fashion as the circuit shown in FIGURE 3 of the drawings to commutate off each of these SCR after a predetermined conducting interval. In addition to the above elements, additional secondary windings 98 and 99 shown in dotted outline form are connected through clamping diode 101 and 102 across the power supply terminals for limiting or clamping the potential appearing across the primary windings halves 91 and 92 to a predetermined safe value.

In operation, the circuit shown in FIGURE 19 can be used to provide low voltage DC power from a high voltage source so that the circuit accomplishes a direct current to direct current stepdown in voltage. If desired, the circuit could by proper fabrication be used to achieve a step up in voltage. By proper design of the coupling between the winding half 92 and its corresponding winding half of secondary 93, the transformer can provide a desired amount of $di/dt$ cushioning for the SCR 97. Similarly, the winding half 91 can provide $di/dt$ cushioning for its associated SCR 95. However, the coupling between the primary and secondary windings must be high enough to provide desired power flow to the load. It is also desirable that the windings be designed to provide relatively high leakage reactance between the two winding halves 91 and 92, for example, so as to prevent high commutating current from flowing to the commutating capacitors 23 and 27. This high leakage reactance also provides relatively low coupling between the two winding halves 91 and 92 so that in effect, $dv/dt$ cushioning is achieved for the SCR's 95 and 97. This occurs when, for example, the SCR 95 is turned on, and full voltage is suddenly applied to the winding half 91. The high leakage reactance between the winding halves 91 and 92 forbids a rapid rise in voltage in the winding half 92 from being applied to the SCR 97. This leakage reactance is, in effect, in series with the commutating capacitor 23 and 27 associated with SCR 95. As a consequence, as SCR 95 is turned on the voltage across SCR 97 rises slowly. Likewise, the voltage across SCR 95 rises slowly as the SCR 97 is turned on. The soft commutation circuit comprised by the elements 23, 24, 26, 27, and 48 achieve soft commutation during turn-off of the SCR's thereby assuring reliable operation of the circuit.

For very low load currents, the commutating capacitors may need resetting after each commutating interval. For this purpose, the output transformer 89 serves to reset the commutating capacitors when the load current is low. In this respect, the primary winding of transformer 89 serves a function of the inductor 29 employed in the circuit of FIGURE 1 for low loads. When operating in this manner, the primary voltage across the primary winding half remains greater than the supply voltage until the core of the output transformer 89 saturates. After saturation, the commutating capacitors are charged to more than twice the source voltage $E_s$ by a half cycle oscillation through the saturated winding half. Upon attaining this condition, one of the rectifiers 94 and 96 will block so that the commutating capacitor remains charged for reset for a new commutation interval.

In certain applications of the time ratio control circuit shown in FIGURE 19, excessive variation in amplitude of the commutating capacitor voltage after reset may occur as the load varies. For this reason, the reset winding 98 and 99 and clamping diodes 101 and 102 are provided for regulating the reset amplitude of the commutating capacitor voltage. In closing it should be noted that the design requirements of the output transformer 89 are critical. The windings of transformer 89 must provide enough inductance when its core saturates to limit the rate of voltage rise across the commutating capacitors and SCR units 95 and 97. Insufficient inductance in the saturated windings will allow excessive $dv/dt$ and excessive capacitor voltage. However, the saturated inductance of the winding halves 92 and 91 must be low enough to avoid excessive delay in resetting or recharing the commutating capacitors after the commutating interval so that the circuit can operate effectively.

Figure 20:
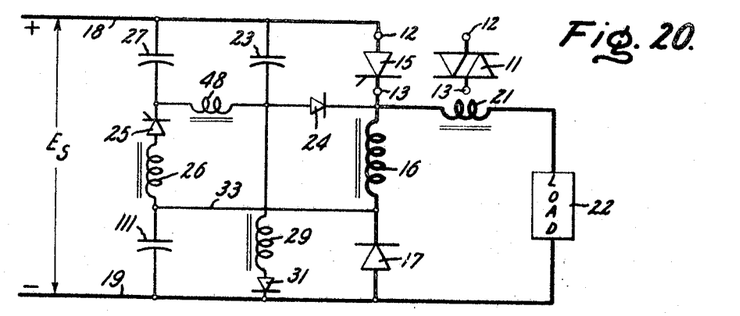
FIGURE 20 is a schematic circuit diagram of a form of time ratio control circuit similar to that of FIGURE 3.

FIGURE 20 of the drawing illustrates a time ratio control power circuit which is similar in many respects to the circuit of FIGURE 1 but differs therefrom in that the series connected auxiliary commutating SCR 25 and first resonating inductor 26 are located in the feedback path from the cushioning inductor 16. This feedback path is comprised by conductor 33. A second reasonating inductor 48 is employed to interconnect the two commutating capacitors 23 and 27 with the two inductors 26 and 48 which together provide about the same amount of inductive reactance as the single inductor 26 of the FIGURE 1 circuit. In addition to these differences a third capacitor 111 is connected between the feedback conductor 33 and the power supply terminal 19.

With the time ratio control power circuit of FIGURE 20, all three commutating capacitors 23, 27, and 111 are charged to essentially the full power supply potential $E_s$ connected across the terminals 18 and 19. With the load current carrying SCR 15 conducting, the auxiliary commutating SCR 25 is turned on to commutate off SCR 15. This results in oscillating the polarity of the charge on the commutating capacitor 27 and subsequently the commutating capacitor 23 in precisely the same manner as was described with relation to the circuit shown in FIGURE 1 of the drawing. Following reversal of the polarity of the charge on the commutating capacitor 23, SCR 15 will be commutated off. The primary distinctions between the circuit of FIGURE 20 and the circuit of FIGURE 1 lie in the fact that the auxiliary commutating SCR 25 prevents the charge on commutating capacitor 27 from being bled off during conducting intervals of the SCR 15. This is not the case with the circuit shown in FIGURE 1 of the drawings where it can be seen that if the conducting intervals of triac 11 is sufficiently long, there is a possibility that the charge on the commutating capacitor 27 will be bled off through diode 28 and cushioning inductor 16 through load 22. This would result in reducing the amount of energy available for commutation during the commutating interval and conceivably could lead to failure of the circuit to commutate properly. With the circuit arrangement of FIGURE 20 this possibility is obviated. In addition, it should be noted that the third commutating capacitor 111 is available to supply any additional energy that might be required by the load 22 during commutation of SCR 15. Further, the presence of this capacitor coupled directly across the coasting diode 17 will soften any voltage spikes developed by the circuit during the commutating interval that otherwise would be applied back directly across the coasting diode.

Figure 21:
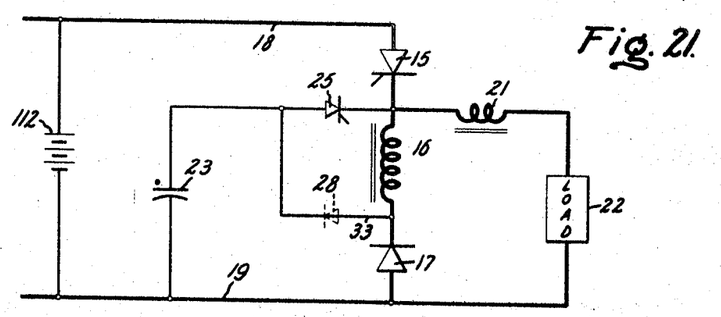
FIGURE 21 illustrates a different form of soft commutation circuit for power semiconductor circuits intended for use with stiff power sources such as batteries or fuel cells.

FIGURE 21 of the drawing illustrates a time ratio-control power circuit which is satisfactory for use with stiff power sources such as the battery shown at 112 or fuel cells, or other direct current power sources exhibiting large capacitive reactances. In the circuit arrangement of FIGURE 31, the commutating capacitor 23, instead of being coupled back to the power supply terminal 18 across SCR 15, is coupled back to the supply terminal so that in effect it is in series with the direct power current source 112. The conductor 33 with or without the blocking diode shown in dotted outline form at 28 is connected back between the cushioning inductor 16 and the juncture of commutating capacitor 23 with auxiliary commutating SCR 25. With this arrangement, upon the SCR 15 being gated on, the commutating capacitor 23 will be charged positive at its dot side to about twice the power supply voltage due to the resonant oscillatory action taking place through the cushioning inductor 16 and feedback path 33. With the blocking diode 28 present in the circuit, this charge will be trapped on the commutating capacitor 23 so as to allow a variable on-time for the load current carrying SCR 15. With the circuit thus arrayed when it is desired to commutate SCR 15 off, the auxiliary commutating SCR 25 is turned on. This results in reverse biasing the load current carrying SCR 15 causing it to turn off. Upon SCR 15 being turned off energy will be circulated through the load 22 by filter inductor 21 and coasting rectifier 17 in conventional coasting fashion. During this interval, auxiliary SCR 25 will continue to conduct until the charge on commutating capacitor 23 is sufficiently reduced to reverse bias SCR 25 and cause it to turn off. The circuit is then conditioned for a new cycle of operation.

In the event that the circuit arrangement of FIGURE 21 is employed without the blocking diode 28, then it would be necessary to so coordinate the gating on of auxiliary commutating SCR 25 with the oscillatory buildup of the charge on the dot side of commutating capacitor 23, so that auxiliary commutating SCR 25 is gated on at the same time that the charge on commutating capacitor 23 reaches a maximum. Otherwise, without blocking diode 28 present, this charge would leak off through cushioning inductor 16 and load 22 and the circuit would fail to commutate. Accordingly, it can be appreciated that the presence of the blocking diode 28 provides some freedom for control of the on time of the load current carrying SCR 15. If the blocking diode 28 is not present, the on time of SCR 15 is dictated by the parameters of the circuit and the requirement that auxiliary commutating SCR 25 be turned on when the charge on commutating capacitor 23 reaches a maximum.

Figure 22:
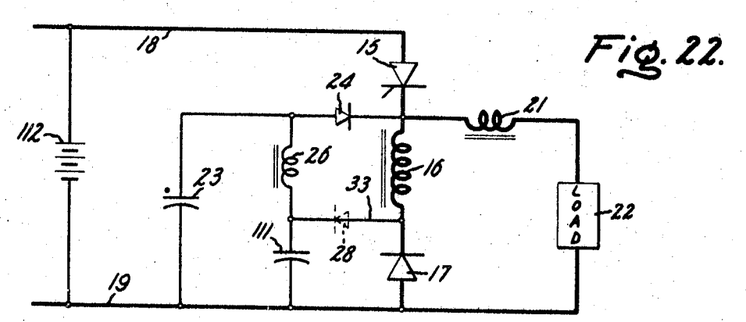
FIGURE 22 is a modified form of the circuit arrangement shown in FIGURE 21.

FIGURE 22 of the drawing illustrates a modification of the circuit shown in FIGURE 21 wherein the need for an auxiliary commutating SCR 25 is obviated. This is accomplished by including a resonating inductor 26 in the feedback path comprised by conductor 33 and the blocking diode 28 (if employed) and the substitution of a coupling diode 24 for the auxiliary commutating SCR 25. In addition, a second commutating capacitor 111 is connected between the feedback conductor 33 and power supply terminal 19. With the arrangement of FIGURE 22, upon load current carrying SCR 15 being turned on, the dot side of commutating capacitor 23 will be charged positively to about twice the power source voltage due to the resonant charging action taking place through the series circuit including the two inductive resonators 26 and 16. As the charge on the dot side of commutating capacitor 23 swings positive with respect to the potential of power supply terminal 18, diode 24 will conduct and reverse bias SCR 15 causing it to be turned off. It should be noted that there is no independent control over the on time of SCR 15 with this circuit arrangement although for certain applications, this feature would be no disadvantage. During the commutation interval, any voltage spikes produced in the commutation circuit are absorbed by the third commutating capacitor 111 similar to the FIGURE 19 circuit, and are not allowed to appear directly across the coasting rectifier 17. After the SCR 15 is commutated off, load current is supplied through load 22 through the filter inductor 21, coating diode 17 and cushioning inductor 16. During this coasting interval the commutating capacitor 23 will supply current to the load 22 through diode 24 until such time that it discharges sufficiently for the diode 24 to block. At this point one cycle of operation has been completed and the circuit is conditioned for a new cycle.

From the foregoing description, it can be appreciated that the present invention provides new and improved soft commutation circuits for use with power semiconductors of the thyristor type requiring external circuitry to accomplish turn-off. The provision of these new and improved soft commutation circuits allows for the use of the thyristor type semiconductor devices at higher frequencies and at larger power ratings than were previously possible. Further, the circuits are of such a design that they can be incorporated into existing power semiconductor circuits to greatly reduce radio frequency interference and other desirable effects.

Having described several embodiments of power semiconductor circuits employing new and improved soft commutation circuits constructed in accordance with the invention, it is believed obvious that other modifications and variations of the present invention are possible in light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. A soft commutation circuit for a power semiconductor comprising a commutating capacitor and blocking diode connected in series circuit relationship, the series circuit thus formed being adapted to be connected across the load terminals of a power semiconductor device of the type requiring a reversal in the polarity of the potential across its load terminals in order to discontinue conduction therethrough, and with the series circuit being connected in such a manner that one load terminal of the commutating capacitor is effectively coupled to one load terminal of the power semiconductor device and serves to limit the rate of rise of voltage across the semiconductor device upon the device being turned off, a resonating inductor having one terminal operatively coupled to the series connected commutating capacitor and blocking diode, and coupling means operatively coupling the remaining terminal of the resonating inductor in a closed series circuit loop with the commutating capacitor, the closed series circuit loop thus formed being tuned to series resonance at a desired commutating frequency and serving to reverse the polarity of the potential across the commutating capacitor during commutating intervals.

2. The combination set forth in claim 1 wherein the coupling means comprises a cushioning inductor, a feedback conducting path and a second capacitor connected in circuit relationship with the resonating inductor for effecting reversal of the polarity of the potential on the commutating capacitor.

3. The combination set forth in claim 1 wherein the coupling means comprises an additional commutating gate controlled power semiconductor connected in series circuit relationship with the resonating inductor across the commutating capacitor.

4. A soft commutation circuit for a power semiconductor comprising commutating capacitance means and unidirectional conducting means connected in series circuit relationship, the series circuit thus formed being adapted to be operatively coupled across the load terminals of a power semiconductor device of the type requiring either a reversal in the polarity of the potential across its load terminals or a reversal in the direction of current flow therethrough in oder to discontinue conduction therethrough, and with the series circuit being connected in a manner such that the commutating capacitance means is operatively coupled across the power semiconductor device and limits the rate of rise of voltage across the device upon the device reverting to its blocking non-conducting condition, resonating and cushioning inductance means operatively connected in circuit relationship with the power semiconductor for limiting the rate of rise of current therethrough upon the semiconductor device being turned-on, and feedback means providing a feedback path between said resonating and cushioning inductance means and said commutating capacitance means for feeding back the energy of the resonating and cushioning inductance means to the commutating capacitance means and reversing the polarity of the potential across the commutating capacitance means during commutating intervals to thereby commutate off the power semiconductor device.

5. A new and improved power control circuit including in combination a load current carrying power semiconductor device of the type requiring reversal of the polarity of the potential across its load terminals to discontinue conduction therethrough, means for providing a turn-on signal to the power semiconductor device, resonating and cushioning inductance means connected in series circuit relationship with the power semiconductor device across a pair of power supply terminals that in turn are adapted to be connected across a source of electric potential, said inductance means serving to limit the rate of rise of load current through the power semiconductor device upon the device being turned on, capacitance means and a unidirectional conducting device connected in series circuit relationship across the load terminals of the power semiconductor device in a manner such that the capacitance means is directly connected across the power semiconductor device and limits the rate of rise of voltage across the device upon the device reverting to its blocking non-conducting condition, and feedback means operatively intercoupled between said resonating and cushioning inductance means and said commutating capacitance means for feeding back the energy of the resonating and cushioning inductance and effecting a reversal in polarity of the potential across the commutating capacitance means during commutating intervals to thereby commutate off the power semiconductor device.

6. The combination set forth in claim 5 wherein the commutating capacitance means comprises first and second commutating capacitors, the first commutating capacitor being connected in series circuit relationship with the unidirectional conducting device across the load terminals of the power semiconductor device, the resonating and cushioning inductance means comprises a separate cushioning inductor and an auxiliary resonating inductor, the auxiliary resonating inductor being connected in series circuit relationship with the second commutating capacitor across the first commutating capacitor and the cushioning inductor being connected in series with the power semiconductor device, and the feedback means comprises a conductor interconnecting the cushioning inductor and the second commutating capacitor.

7. The combination set forth in claim 5 further characterized by an auxiliary commutating gate controlled power semiconductor device connected in series circuit relationship with the resonating inductor and the second commutating capacitor.

8. The combination set forth in claim 5 further characterized by a charging inductor and series connected blocking diode connected in series circuit relationship with the commutating capacitor across the power supply terminals.

9. A new and improved power control circut including in combination a load current carrying triac bidirectional conducting semiconductor device, a cushion inductor and a coasting triac bidirectional conducting semiconductor device connected in series circuit relationship across a pair of power supply terminals that in turn are adapted to be connected across a source of electric potential, a filter inductor and a load connected in series circuit relationship between an intermediate point on the cushion inductor and the power supply terminal to which the coasting triac is connected, a first commutating capacitor and first blocking diode connected in series circuit relationship across the load terminals of the load current carrying triac, a second commutating capacitor and second blocking diode connected in series circuit relationship across the load terminals of the coasting triac, and a resonating inductor having one terminal operatively coupled to the juncture of the series connected first commutating capacitor and first blocking diode, and having its remaining terminal connected to the juncture of the second commutating capacitor and second blocking diode.

10. The combination set forth in claim 9 further characterized by an auxiliary commutating triac bidirectional conducting device connected in series circuit relationship with the resonating inductor.

11. A new and improved power control circuit including in combination a first load current carrying gate controlled triac bidirectional conducting device, a first cushioning inductive reactor, a second cushioning inductive reactor and a second gate controlled triac bidirectional conducting device all connected in series circuit relationship across a pair of power supply terminals that in turn are adapted to be connected across a source of electric potential, a load connected intermediate the juncture of the first and second cushioning reactors and the power supply terminal connected to the second triac, a first commutating capacitor and first blocking diode connected in series circuit relationship across the load terminals of the first load current carrying triac, a second commutating capacitor and second blocking diode connected in series circuit relationship across the load terminals of the second triac, said first cushioning reactor comprising a transformer having its primary winding connected in series circuit relationship with the load current carrying triac and having its secondary winding connected in series circuit relationship with a resonating inductor to the juncture of the series connected second commutating capacitor and second blocking diode, and said second cushioning reactor comprising a transformer having its primary winding connected in series circuit relationship with the second triac and having its secondary winding connected in series relationship with a resonating inductor to the juncture of the series connected first commutating capacitor and first blocking diode.

References Cited

UNITED STATES PATENTS

| 3,189,782 | 6/1965 | Aeffron | 307—305 X |
| 3,300,656 | 1/1967 | Meirer et al. | 307—252 X |

DONALD D. FORRER, Primary Examiner

U.S. Cl. X.R.

307—305